June 15, 1971    D. G. JAMES    3,585,059
PROCESS FOR PRODUCTION OF BARRIER COATED NYLON FILM
Original Filed Aug. 16, 1966    3 Sheets-Sheet 2

INVENTOR.
DANIEL G. JAMES
BY

AGENT

INVENTOR
DANIEL G. JAMES
BY
AGENT

3,585,059
PROCESS FOR PRODUCTION OF BARRIER COATED NYLON FILM

Daniel G. James, Chester, N.J., assignor to Allied Chemical Corporation, New York, N.Y.
Original application Aug. 16, 1966, Ser. No. 572,796, now Patent No. 3,514,367, dated May 26, 1970. Divided and this application Oct. 10, 1969, Ser. No. 870,868
Int. Cl. B32b 27/34; B44d 1/16
U.S. Cl. 117—7                13 Claims

ABSTRACT OF THE DISCLOSURE

A process for coating nylon film with a polyurethane primer coating, a waterproof coating and a barrier coating, and an article produced by the process. The coated film may be laminated to polyethylene film.

---

This is a division of application, Ser. No. 572,796, filed Aug. 16, 1966, now Pat. 3,514,367.

This application relates to novel coated nylon films and to novel processes for the production thereof, and particularly to barrier coated films and processes for their production, the terminology "barrier coated film" being used herein to denote a substrate film to which has been applied a coating which is a barrier to (i.e., is relatively impermeable to) oxygen.

Barrier coated films are particularly useful in the food packaging industry for packaging such products as lunch meats and cheeses due to the long product shelf life which they provide. In addition to very low oxygen permeability, such films must be easily thereomoformable, of such a degree of transparency and gloss as to give an eye-appealing view of the product wrapped therein, and the various coatings comprising the film must not separate from each other. Furthermore, the films must be of such a character so as not to impart either odor or taste to the products wrapped therein.

The novel barrier coated films which I have discovered possess the above properties and comprise broadly a nylon substrate film, a polyurethane primer coating and a barrier coating of a copolymer of vinylidene chloride with one or more of the following comonomers:

methacrylic acid and its alkyl esters
acrylic acid and its alkyl esters
acrylonitrile
methacrylonitrile
vinyl chloride
itaconic acid the vinylidene chloride being present in the amount of about 88% to about 96% by weight. With respect to the alkyl esters of methacrylic and acrylic acid, those esters in which the alkyl group has from 1 to 8 carbon atoms have been found to be most suitable, i.e. methyl, ethyl, propyl, butyl, pentyl, hexyl, heptyl and octyl methacrylate and acrylate.

The nylon substrate film used in my novel films can range from about ½ to about 5 mils in thickness, preferably about ½ to 2 mils. The polyurethane primer coating is the reaction product of a polyester component and a diisocyanate component and is deposited from solution in an organic solvent such as acetone, toluene or ethyl acetate or mixture thereof. The primer coating can range from about 0.005 to about 0.05 mil thickness, preferably about 0.01 to about 0.02 mil. The barrier coating is preferably from about 90 to about 95% by weight vinylidene chloride, can be from about 0.08 to about 0.32 mil thick, preferably about 0.08 to about 0.16 mil, and is deposited from a dispersion in water.

The novel process which I have discovered for making the above-described film comprises broadly the steps of:

(1) gravure roll coating a nylon substrate film with a solution of polyurethane primer in an organic solvent,
(2) removing organic solvent from the primer-coated substrate film,
(3) metering bar coating the primer-coated substrate film with a barrier coating of a copolymer of vinylidene chloride dispersed in water, the copolymer containing about 88% to about 96% by weight vinylidene chloride, and
(4) removing water from the barrier-coated film.

I have found that the particular type of nylon which is obtained from polycondensation of caprolactam and which is known as and hereafter referred to as nylon 6 is preferred for use as the substrate film because of its excellent thermoformability and resistance to abrasion. However, the deposition of a barrier coating from a water dispersion onto a nylon 6 substrate presents the problem that the substrate wrinkles when contacted with water.

The present invention provides two specific embodiments of the above novel process by which to overcome the problem of such wrinkling. The first such embodiment comprises the steps of:

(1) gravure roll coating of nylon 6 substrate film with a solution of polyurethane primer in an organic solvent,
(2) removing organic solvent from the primer-coated substrate film,
(3) gravure roll or size press coating the primer-coated film with a waterproof coating of a solution of about 70–95% vinylidene chloride and about 5–30% by weight acrylonitrile,
(4) removing organic solvent from the waterproof coated film,
(5) metering bar coating the waterproof coated film with a barrier coating of a water dispersion of a copolymer of vinylidene chloride containing about 88% to about 96% by weight vinylidene chloride, and
(6) removing water from the barrier coated film.

The deposition of a waterproof coating on the primed nylon 6 substrate is sufficient to protect the nylon 6 from the water in the barrier coating dispersion, thus preventing wrinkling of the film.

The specific embodiment of the novel film which is produced by this process comprises a nylon 6 substrate film, a polyurethane primer coating on said substrate film, a waterproof coating of a copolymer of about 70–95% by weight vinylidene chloride and about 5–30% acrylonitrile, and a barrier coating of a copolymer of vinylidene chloride on said waterproof coating, the barrier coating copolymer containing vinylidene chloride in the amount of about 88 to about 96% by weight. The barrier coated film is substantially free of organic solvent.

In this embodiment of the film the nylon 6 substrate film can be from about ½ to about 5 mils in thickness, preferably from about ½ to about 2 mils in thickness; the polyurethane primer layer can be from 0.005 to about 0.05 mil thick, preferably about 0.01 to about 0.02 mil; the waterproof coating preferably contains about 75–90% by weight vinylidene chloride and 10–25% acrylonitrile, can range from about 0.01 to about 0.05 mil thick, preferably from about 0.05 mil thick, preferably from about 0.01 to 0.03 mil, and is deposited from solution in acetone, toluene or methyl ethyl ketone; and the barrier coating preferably is a copolymer of vinylidene chloride, acrylonitrile, and methyl acrylate containing from about 90% to about 95% by weight vinylidene chloride and can range from about 0.08 to about 0.32 mil thick, preferably from 0.08 to about 0.16 mil.

The second and preferred specific process embodiment which I have discovered which overcomes the problem of wrinkling of nylon 6 comprises the steps of:

(1) gravure roll coating a nylon 6 substrate film with a solution of polyurethane primer in an organic solvent.
(2) removing solvent from the primer-coated substrate film,
(3) metering bar coating the primer-coated substrate film with a barrier coating of a water dispersion of a copolymer of vinylidene chloride, said copolymer containing about 88% to about 96% by weight vinylidene chloride,
(4) removing water from the barrier-coated substrate film, and
(5) controlling the tension of the film, preferably automatically, during steps 1-4 prevent wrinkling of the film.

I have found that when the tension of the film during coating is controlled, the previously described waterproof coating can be omitted from the film without incurring a wrinkling problem.

The specific embodiment of the above-mentioned novel film produced by this preferred process comprises nylon 6 substrate film, a polyurethane primer coating on said substrate film, and a barrier coating of a copolymer of vinylidene chloride containing vinylidene chloride in the amount of about 88% to about 96% by weight. The barrier coated film is substantially free of organic solvent.

In this embodiment of the film the nylon 6 substrate film can be from about ½ to about 5 mils in thickness, preferably about ½ to about 2 mils; the polyurethane primer layer can be from about 0.005 to about 0.05 mil thick, preferably about 0.01 to about 0.02 mil; and the barrier coating is preferably a copolymer of vinylidene chloride, acrylonitrile and methyl acrylate containing from about 90 to about 95% by weight vinylidene chloride and can range from about 0.08 to about 0.32 mil thick, preferably from about 0.08 to about 0.16 mil.

The invention will now be more particularly described with reference to the drawings in which.

Figure 1:
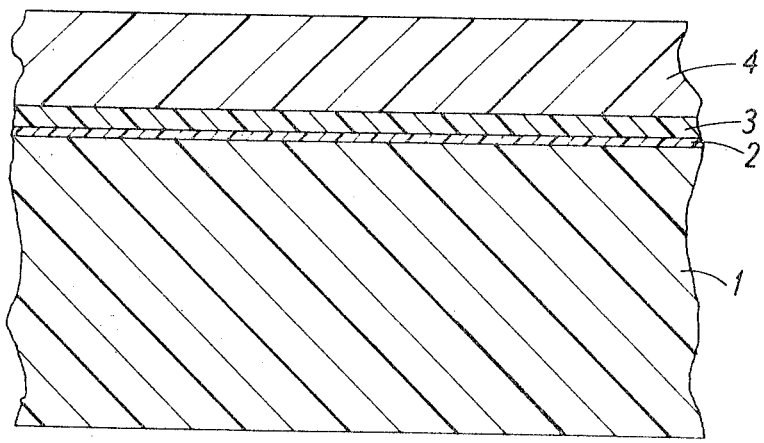
FIG. 1 is a cross-sectional view of the film produced by the first specific embodiment of the novel process of this invention.

With respect to FIG. 1, reference numeral 1 indicates the substrate film of nylon 6. This film can be of ½ to 5 mils thickness and i preferably of ½ to 2 mils thickness. Reference numeral 2 indicates the polyurethane primer coating which can range from about 0.005 to about 0.05 mil thick, preferably about 0.01 to about 0.02. Reference numeral 3 indicates the waterproof coating of a copolymer of about 70–95% by weight vinylidene chloride and about 5–30% by weight acrylonitrile. The waterproof coating can be of about 0.01 to about 0.05 mil thickness, preferably about 0.01 to about 0.03 mil. Reference numeral 4 indicates a barrier coating of a copolymer containing about 88 to about 96% by weight vinylidene chloride, with the remainder consisting of one or more of the following comonomers:

methacrylic acid and its alkyl esters,
acrylic acid and its alkyl esters,
acrylonitrile,
methacrylonitrile,
vinyl chloride,
itaconic acid.

The barrier coating can range from about 0.08 to about 0.32 mil thickness, and is preefrably from about 0.08 to about 0.16 mil thick.

Figure 2:
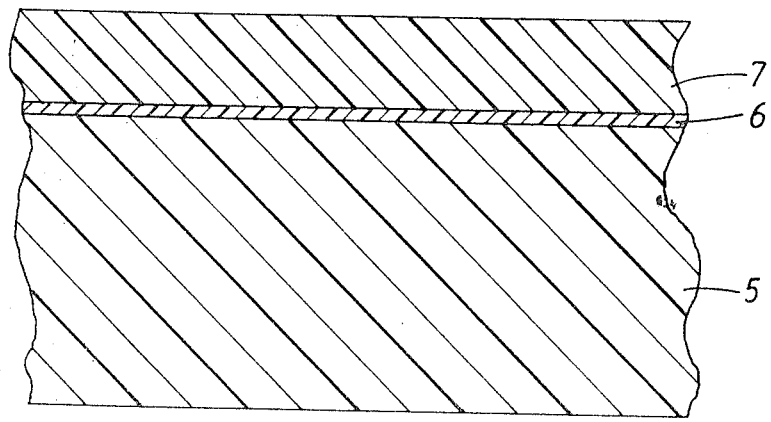
FIG. 2 is a cross-sectional view of the film produced by the second and preferred specific embodiment of the process of this invention.

With respect to FIG. 2, reference numeral 5 indicates the substrate film of nylon 6 which can be from about ½ to 5 mils thickness, preferably about ½ to about 2 mils. Reference numeral 6 indicates the polyurethane primer coating which is of about 0.005 to about 0.05 mil thickness, preferably about 0.01 to about 0.02 mil. Reference numeral 7 indicates a barrier coating of a copolymer of vinylidene chloride with one or more of the comonomers set forth in the previous paragraph. The barrier coating contains about 88% to about 96% by weight vinylidene chloride and can range from about 0.08 to about 0.32 mil thick, preferably about 0.08 to about 0.16 mil. All of the coating thicknesses set forth in this specification and in the accompanying claims are dry thicknesses, i.e. thicknesses of the coatings in their finished form after application and drying.

Figure 3:
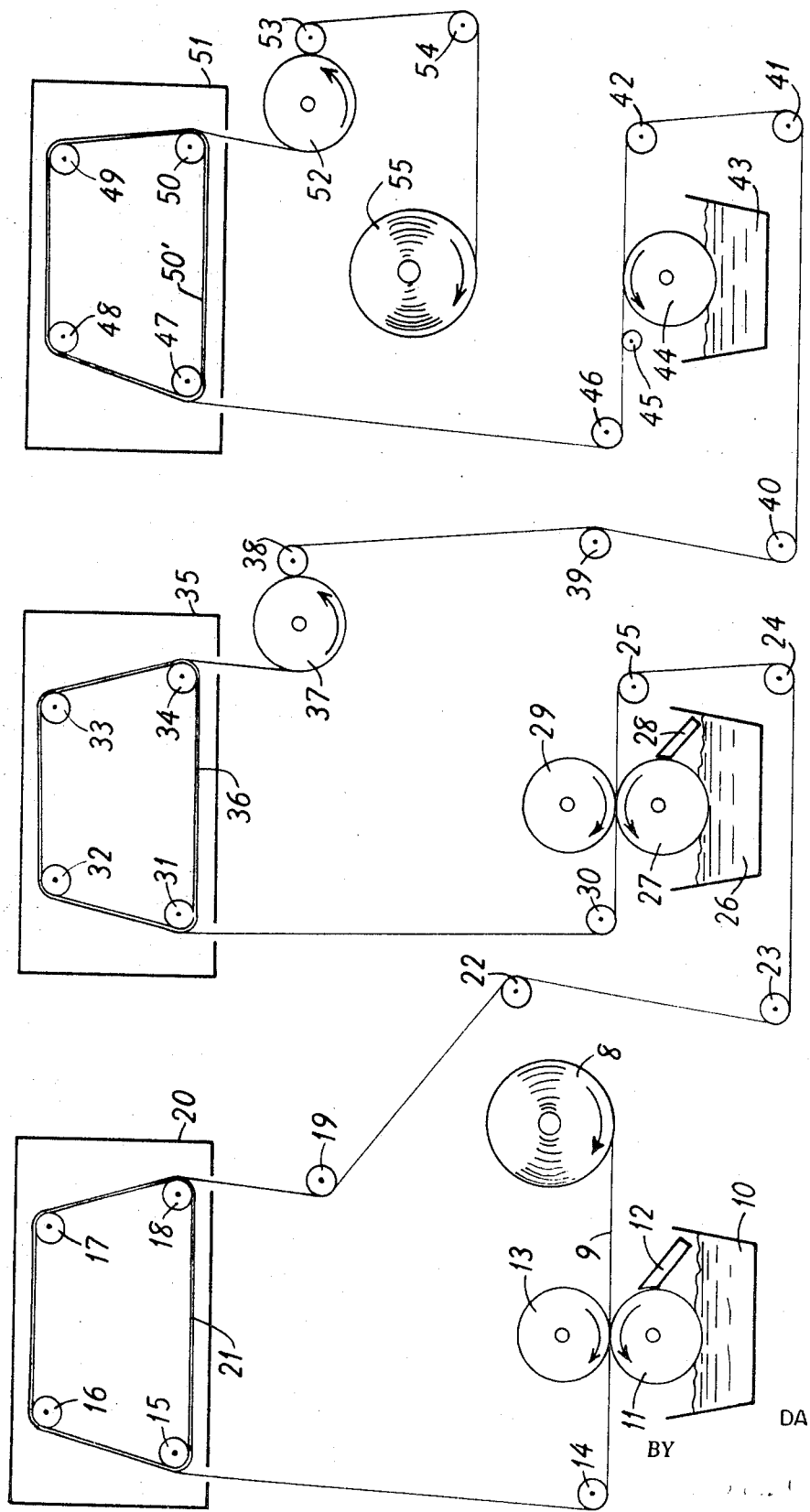
FIG. 3 is a schematic view of the apparatus used in carrying out the first specific embodiment of the process of this invention.

With respect to FIG. 3, reference numeral 8 indicates the unwind roll from which the nylon 6 is fed. Reference numeral 9 indicates the substrate film of nylon 6 and will be used hereafter to denote the coated film in the various stages of this embodiment of the process. Reference numeral 10 indicates a reservoir of primer, said primer comprising a polyester component and an isocyanate-catalyst component which together from a polyurethane. Globe-Hamilton 118–17 primer is an example of the polyester component and Globe-Hamilton 118–18 catalyst is an example of the isocyanate-catalyst component. Both are made by Globe/Hamilton Color Works, Inc. of Chicago, Ill. The former is a polyester having approximately the following composition by weight:

| | Percent |
|---|---|
| Ethylene glycol | 14.3 |
| 2,2-dimethyl 1,3-propanediol (neopentyl glycol) | 19.7 |
| Terephthalic acid | 66.0 |

The latter component is a polyol-tolylene diisocyanate condensation product.

Reference numeral 11 indicates a gravure roll which picks up the primer and deposits it on the underside of film 9. Reference numeral 12 indicates a doctor blade which serves to scrape excess primer from the gravure roll. Reference numeral 13 denotes the rubber compression roll which is used to hold the film 9 against the gravure roll. The gravure roll is driven by a motor which is not shown. The compression roll may also be driven if desired. These rolls draw the film from unwind roll 8. Reference numerals 14, 15, 16, 17 and 19 indicate idler rolls, idler rolls 15, 16 and 17 being located in a first dryer 20 which removes solvent from the primer-coated substrate film. The dryer is of conventional construction. During its passage through dryer 20 the film 9 is preferably carried on a belt 21 which is driven by a drive roll 18. Upon emerging from the dryer the primer-coated film 9 is cooled by conventional means and then passes over idler rolls 22, 23, 24 and 25 to a second coating station composed of a second reservoir 26 filled with a solvent solution of a copolymer of vinylidene chloride and acrylonitrile. The copolymer consists of about 70–95% by weight vinylidene chloride and about 5–30% by weight acrylonitrile, for example, Saran F220, marketed by the Dow Chemical Co. of Midland, Mich. The function of this coating is to waterproof the nylon 6 substrate film to prevent its wrinkling due to water sensitivity. The copolymer is received as a solid and may be dissolved in acetone for application. Another solvent which can be used is a mixture of toluene and methyl ethyl ketone. This second coating station also consists of a motor driven gravure roll 27, a doctor blade 28, and a rubber compression roll 29 which may be motor driven if desired. These rolls serve to pull the film therebetween and operate in the same manner as those of the first coating station. I have found that size press coating is also suitable as a method of applying the waterproof coating. By size press coating I mean gravure coating with a smooth surfaced roll. Hereafter in the specification and claims, when used in conjunction with application of the waterproof coating, the terminology gravure roll coating is meant to encompass also size press coating. The waterproof coated film emerges from the second coating station and passes over idler rolls 30, 31, 32, and 33 and drive roll 34, of which 31, 32, 33, and 34 are located in a second dryer 35 which preferably has a belt 36 carrying the film in the same manner as the belt of dryer 20. The dryer is of conventional construction and serves to remove organic solvent from the waterproof-coated film. After passing from dryer 35, the film 9 passes over a cooling drum 37 which is maintained at about ambient temperature, around which it is partially wrapped by roller 38. The film then passes over idler rolls 39, 40, 41 and 42 to a third coating station, where a reservoir 43 contains a water dispersion of a barrier coating of a copolymer of vinylidene chloride with one or more of the following cmonomers:

methacrylic acid and its alkyl esters
acrylic acid and its alkyl esters
acrylonitrile
methacrylonitrile
vinyl chloride
itaconic acid.

The barrier-coating copolymer is about 88–96% by weight vinylidene chloride, preferably 90–95%. The preferred barrier coating copolymer is composed of vinylidene chloride, acrylonitrile and methyl acrylate. When the barrier coating copolymer contains below 88% vinylidene chloride the coated film does not present a satisfactory barrier coating (i.e. it passes more than 1 cc./100 in.$^2$-24 hours-atm.); when the barrier coating copolymer contains above 96% vinylidene chloride the barrier coating on the film is too brittle to be satisfactorily used. The barrier coating copolymer may be, for example, Daran 210, marketed by Dewey and Almy Division of W. R. Grace & Co., Cambridge, Mass. A smooth-surfaced driven roller 44 picks up barrier coating from reservoir 43 and deposits it on the underside of the film 9. The film then passes over a metering bar 45 which consists of a wire-wound rod. This metering bar serves to scrape excess barrier coating from the coated film in such a way as to assure a uniform coating which will yield a coat of the desired dry thickness. More than one metering bar can be used if desired.

I have found that a conventional air knife can be used, if desired, instead of or together with the wire-wound rod for scraping away excess coating. The terminology metering bar coating when used hereafter in the specification and claims is meant to encompass smooth roll coating the film and scraping away the excess coating with either a wire-wound rod, an air knife, or a combination thereof.

After emerging from the third coating station, the barrier coated film passes over rubber covered driven roll 46, idler rolls 47, 48 and 49 and drive roll 50, of which 47, 48, 49 and 50 are located in third dryer 51. Dryer 51 is of conventional construction and serves to remove water from the barrier coated film. Again the film is preferably carried through the dryer on a belt 50'. Afte emerging from dryer 51, the coated film passes over a cooling drum 52 which is maintained at about ambient temperature and then over roll 53 positioned immediately adjacent thereto in such a manner as to cause the film to wrap partially around cooling roll 52. After passing over roll 53 the cooled coated film passes over an idler roll 54 and onto a rewind spool 55.

In summary, the substrate nylon 6 film has been coated with a primer which serves to bond a subsequent waterproof coating thereto, which waterproof coating serves to protect the nylon film from the water in a subsequent barrier coating.

Although the primer and waterproof coatings are applied from solution in organic solvent, they give rise to no odor and taste problems in the product film because the thinness of these coatings allows the organic solvents to be substantially completely removed during the drying steps.

Figure 4:
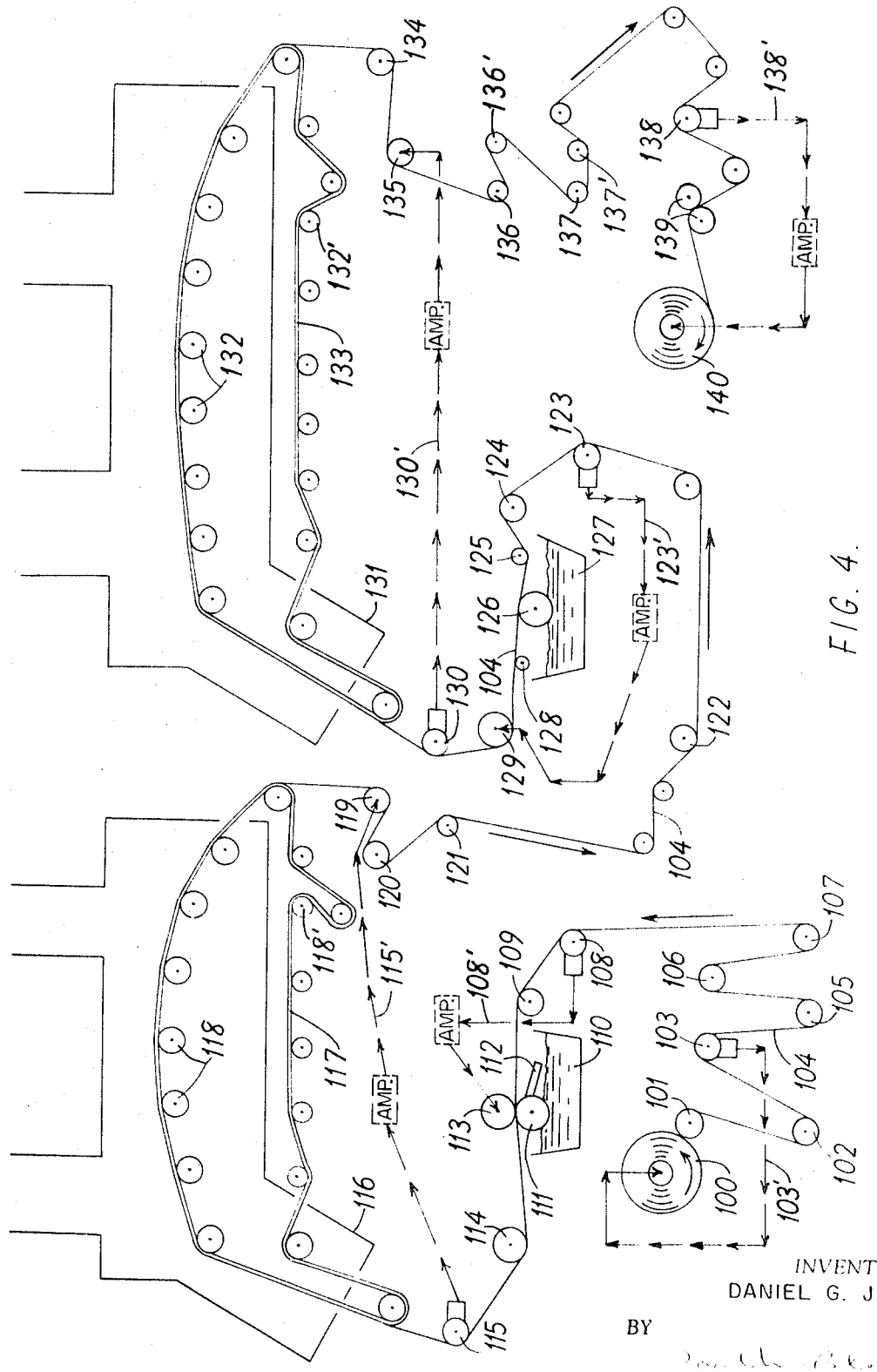
FIG. 4 is a schematic view of the apparatus used in carrying out the second and preferred specific embodiment of the process of this invention.

FIG. 4 is a schematic view of apparatus for carrying out the second and preferred specific embodiment of the process of this invention. Nylon 6 substrate film is fed from an unwind roll 100 and passes over idler rolls 101 and 102 and then over a brake controlling roll 103. This roll is equipped with a feedback system which sends a signal to a braking apparatus on unwind roll 100, as indicated by arrows 103'. The lower the tension in the film at 103, the more braking which results at 100 and vice versa. In this manner a smooth, taut feed-sheet of substrate film is assured. The film 104 then passes over the main drive roll 105, over idler rolls 106 and 107 and a first tension sensing roll 108. After passing over roll 108 the film passes over a conventional bowed roll 109 which exerts a transverse stretching effect on the film. This stretching effect, while insufficient to distort the film, is sufficient to insure wrinkle-free feed.

The film then passes through a first coating station composed of a reservoir 110, containing a polyurethane primer of the type previously described, a motor driven gravure roll 111, a doctor blade 112 and a rubber compression roll 113 which may be motor driven if desired. The gravure roll 111 is so positioned as to dip into reservoir 110. The rolls 111 and 113 rotate in the direction of travel of the film thus drawing the film between them and the film is pressed against the gravure roll 111 by the rubber compression roll 113. As gravure roll 111 dips into the primer and rotates to contact the film, any excess primer is removed from the roll by the use of doctor blade 112 which scrapes excess material from the roll. Thus a thin, even coating of the primer is deposited on the nylon 6 substrate film 104. The speed of the motors driving rolls 111 and 113 is variable and is adjusted automatically by means of a signal fed forward to variable speed drive means as indicated by arrows 108', from first tension sensing roll 108 so as to maintain proper tension in the film between the main drive roll 105 and the nip formed by the rolls 111 and 113. The means by which the speed adjusting signal is transmitted and received is conventional pneumatic, electric or hydraulic automatic control equipment which may include an amplifier; however, since such equipment is conventional the details of the circuits have not been shown.

After passing through the nip the film passes over an idler roll 114 and over second tension sensing roll 115. The film and the rolls are so positioned that only the dry side of the film contacts the rolls, for obvious reasons. After passing over second tension sensing roll 115 the film enters a first dryer 116 wherein it passes over a series of idler rolls, for example 118, and wherein the organic solvent is removed from the primer coated film. The film, when in the dryer, is preferably carried on a belt 117 which is driven by drive roll 118'. After emerging from first hot-air dryer 116, the film passes over a drive roll 119. Drive roll 119 is driven by variable speed drive means at a speed responsive to a signal, indicated by arrows 115' fed from second tension sensing roll 115 through conventional automatic control equipment, thus maintaining the proper degree of tension in the film while it passes through hot-air dryer 116. Belt drive roll 118' is preferably interconnected with drive roll 119 so as to be driven at a slightly slower speed than 119. If desired, signal 115' may be fed directly to variable speed drive means on roll 118'.

After passing over drive roll 119, the film 104 passes over cooling drum 120 which is maintained at about ambient temperature. The cooling drum 120 is positioned in such a manner with respect to drive roll 119 and adjacent roll 121 as to require the film to wrap around a major portion of cooling drum 120. If desired, more than one cooling drum can be used, or drive roll 119 can be, in addition, a cooling drum. After passing over idler roll 121 the cooled primer-coated film 104 passes over additional idler rolls such as 122, and then over third tension sensing roll 123 and bowed roll 124 and beneath an idler roll 125 which forces the film against a smooth-surfaced applicator roll 126. The applicator roll 126 transfers a barrier coating, previously described with respect to FIG. 2, from a reservoir 127 onto the underside of film 104. A wire-wound metering bar 128 of the type previously described is used to meter the amount of barrier coating applied to film 104. This metering bar serves to scrape the coated film in such a way as to assure a uniform coating of the desired thickness. More than one metering bar can be used if desired.

I have found that a conventional air knife can be used, if desired, instead of or together with the wire-wound rod for scraping away excess coating. The terminology metering bar coating when used hereafter in the specification and claims is meant to encompass smooth roll coating the film and scraping away the excess coating with either a wire-wound rod, an air knife, or a combination thereof.

After passing over driven rotating metering bar 128 the barrier coated film 104 passes over a drive roll 129 which is driven by variable speed drive means at a speed controlled by a signal 123' fed forward from third tension sensing roll 123 through conventional automatic control equipment. The film then passes over fourth tension sensing roll 130 and then into a second dryer 131 where it passes over a series of idler rolls, for example 132. The film, when in the dryer is preferably carried on a belt 133 which is driven by drive roll 132'. Drive roll 134, positioned adjacent the exit from dryer 131, is driven at a speed responsive to a signal, indicated by arrows 130', fed from fourth tension sensing roll 130 thus maintaining the proper degree of tension in the film while it passes through the hot-air dryer. Belt drive roll 132' is preferably interconnected with drive roll 134 so as to be driven at a slightly slower speed than 134. If desired, signal 130' may be fed directly to variable speed drive means on roll 132'.

After passing over drive roll 134, the film passes over a cooling drum 135 which is maintained at about ambient temperature. If desired, more than one cooling drum can be used, or drive roll 134 can itself be a cooling drum. The cooled, primer coated film 104 then passes over additional idler rolls such as 136, 136', 137 and 137' and over an additional tension sensing roll 138. The film then passes through a set of conventional divergent nip rolls 139 which exert a transverse stretching force on the film to a degree sufficient to prevent wrinkle formation but not sufficient to permanently stretch the film. The film then passes onto a rewind spool 140 which is driven by a variable speed motor at a speed responsive to a signal 138' fed from tension sensing roll 138, by means of conventional automatic control equipment, so as to maintain a proper degree of tension in the film.

I have found that the tension in the film during the above process should be maintained at about 0.25% to 40%, preferably 5–25%, of the yield point of the film being used, when the yield point is expressed in lbs./in. By yield point I mean the first point on a stress-strain curve for the film at which strain increases without increase in stress. The yield point is normally expressed in pounds per square inch. In order to express it in pounds per inch the yield point in lbs./sq. in. is multiplied by the thickness of the film in inches. ASTM Specification D882–612T was used in determining the stress-strain curve of the film.

By means of this second specific embodiment of the process of this invention it is possible, by controlling tension in the film, preferably automatically, to eliminate the waterproof coating and dryer therefor used in the first specific embodiment of the process with consequent savings in cost. For this reason the second specific embodiment of the process is the preferred embodiment.

The following table shows a comparison of the properties of several samples of the barrier coated film made by the first specific embodiment of the process of this invention with the properties of several samples of barrier-coated 50M25 Mylar packaging film (Mylar is a trademark for polyethylene terephthalate film). The barrier coating copolymer used on the nylon 6 film consisted of about 90% by weight vinylidene chloride with methyl acrylate and acrylonitrile:

| Property | Barrier coated film | |
|---|---|---|
| | Mylar | Nylon 6 |
| $O_2$ transmission rate, cc./100 in.$^2$-atm.-24 hrs | <1.0 | <1.0 |
| Adhesion | [1] Passed | [1] Passed |
| Odor | 6.4 | 7.2–8.8 |
| Taste | 6.2 | 8.8–10 |
| Retained solvent, percent | Trace | <0.05 |
| Wrinkles | None | None |
| Haze, percent | 4.7 | 3.1–4.6 |
| Gloss | 70 | 70–106 |

[1] Ambient conditions; scored specimen.

The following table shows a comparison of the properties of several samples of the film made by the second and preferred specific embodiment of the process of this invention with the properties of several samples of barrier-coated 50M25 Mylar packaging film. The barrier coating copolymer used on the nylon 6 film consisted of about 90% by weight vinylidene chloride with methyl acrylate and acrylonitrile; the nylon 6 film was about ½ mil thick, the primer coating was about 0.01 mil thick and the barrier coating was about 0.16 mil thick.

| Property | Barrier coated film | |
|---|---|---|
| | Mylar | Nylon 6 |
| Oxygen transmission rate, cc./100 in.$^2$-atm.-24 hrs | 0.5–0.9 | 0.5–0.9 |
| Adhesion | [1] Passed | [1] Passed |
| Odor | 6.4 | 6.5–8.5 |
| Taste | 6.2 | 9–10 |
| Retained solvent | Trace | Trace |
| Wrinkles | None | None |
| Haze, percent | 4.7 | 3–5 |
| Gloss | 70 | 68–85 |

[1] Specimen scored and tested after aging 16 hours at 100% relative humidity.
[2] <100 p.p.m.

The above tables show that the barrier coated nylon 6 films of both specific embodiments of the process of this invention are either comparable to or superior to barrier coated Mylar films in each of the above properties. The data shows superiority in the properties of odor, taste, haze and gloss. Barrier coated Mylar was used in the above tables for comparison purposes due to its wide acceptance in the packaging industry for packaging such things as lunch meats.

Although "barrier coated film" has been defined herein as meaning a barrier to oxygen, the barrier coated films of this invention also exhibit good barrier properties with respect to gases such as water vapor, $CO_2$ and nitrogen.

Before use as a packaging material the barrier coated films of this invention are preferably laminated to polyethylene film by a conventional laminating process utilizing an adhesive. Alternatively the polyethylene can be applied by extrusion coating. The barrier coated films are preferably laminated to or coated with polyethylene before use as a packaging material chiefly because of the superior heat-sealability which the polyethylene provides. The resulting laminate thus incorporates the best features of its two components, i.e. the superior oxygen-barrier properties of the barrier coated nylon 6 and the superior heat sealability of polyethylene.

Laminates of the films of this invention and of barrier coated Mylar, made by laminating these films to polyethylene, were compared by vacuum packaging lunch meat samples (bologna and hot dogs) therein by heat sealing, and aging the samples under extreme shelf-life conditions (38° F., 50–70% relative humidity and 125 foot candles of light with lights on 24 hours per day). The barrier coated nylon 6 laminates were found to be equivalent in shelf life to the barrier coated Mylar laminates, both having a shelf-life (the length of time before the packaged meat discolored) of more than 10–14 days. Barrier coated nylon 6 laminates were found to be superior in that they could be formed (by drawing) into deep containers (for example, 1½" to 1¾") with less incidence of ruptured containers than the barrier coated Mylar laminates.

In addition to providing a superior packaging material for lunch meats and cheeses, the films of this invention have been found to provide a superior packaging material for frozen vacuum packaged meats, due to their ability to withstand the tensile stresses at low temperature caused by expansion of meats on freezing, and the abrasion and flexing caused by handling at low temperatures.

The manner of testing of each of the various properties of the film set forth in the above tables is described in the paragraphs below.

TRANSMISSION RATE

The film sample to be tested was mounted in a volumetric gas transmission cell (maintained at 73° F.) so as to form a barrier between the two chambers of the cell. The first chamber was pressurized to 50 p.s.i.g. with oxygen. The second chamber, which was maintained at atmospheric pressure, was connected to a glass capillary containing a short column of liquid whose movement measured the change in gas volume in the second chamber due to the passage of gas through the film sample during the test. The resultant volume change was converted into the units of cc./100 in.$^2$ of film surface-24 hrs., elapsed time-atmosphere of imposed pressure. An oxygen transmission rate of 1.0 cc./100 in.$^2$–24 hrs.-atm. or less is considered necessary by the packaging industry in order to assure reasonable shelf-life of lunch meats and cheeses.

ADHESION

The "Scotch Tape" test was used, since it is the standard type of adhesion test used in the film coating industry, Scotch brand cellophane tape (No. 610) was applied to the surface to be tested and then pulled from the tested surface and examined. If the tape had lost its tackiness due to adhered coating or the tested surface showed signs of peeling, the test was a failure. Several modifications of this test were used, some of which are outlined below:

(a) Ambient conditions:
   Sample scored (lightly scratching a grid pattern on the coated surface with a razor blade), tape applied and removed slowly.
   Sample scored, tape applied and removed with a rapid jerking motion.
   Same as the above two tests but without scoring the sample.
(b) After aging at 140° F., sixteen hours, and 100% relative humidity, the same tests as set forth above.

ODOR

The odor test of the National Flexible Packaging Association was used. This test uses a scale of 0–10 with 10 indicating no odor.

TASTE

The taste test of the National Flexible Packaging Association was used. This test uses a scale of from 0–10 with a value of 10 indicating no taste.

RETAINED SOLVENT

A 2-ft.$^2$ piece of film was inserted in a one-liter flask with a threaded neck. The top of the flask was sealed with aluminum foil and tape and then the cap was screwed on. The flask was heated in an oven at 60° C. for an hour. The flask was removed and cooled at room temperature and the cap removed. A 2 ml. sample of the air in the flask was taken by inserting a hypodermic needle through the foil and pumping the plunger several times. The sample was analyzed for retained solvent in a gas chromatograph.

WRINKLES

This was a subjective test done by visual examination.

HAZE

Haze measurements were made using ASTM test D1003–61. Results are expressed in percent of light failing to pass through the film due to haze. Thus, the lower the value, the less haze present.

GLOSS

Gloss was measured by the use of a Gardner gloss meter at a 20° angle. The value indicates the reflectance of the film. The higher the value, the glossier the film.

While the invention has been described with particular reference to specific embodiments, it is to be understood that it is not to be limited thereto but is to be construed broadly and restricted solely by the scope of the appended claims.

I claim:
1. The process of making a plastic film comprising:
   (a) gravure roll coating a nylon substrate film with a solution of polyurethane primer in an organic solvent,
   (b) removing organic solvent from the primer-coated substrate film,
   (c) metering bar coating the primer-coated substrate film with a water dispersion of a barrier coating of a copolymer of vinylidene chloride with at least one comonomer selected from the group consisting of:
      methacrylic acid and its alkyl esters,
      acrylic acid and its alkyl esters,
      acrylonitrile,
      methacrylonitrile,
      vinyl chloride, and
      itaconic acid,
   the copolymer containing about 88% to about 96% by weight vinylidene chloride,
   (d) removing water from the barrier-coated film.
2. The process of claim 1 wherein the alkyl esters of methacrylic and acrylic acid are those having an alkyl group containing 1–8 carbon atoms.
3. The process of making plastic film comprising:
   (a) gravure roll coating a poly(ε-caprolactam) with a solution of polyurethane primer in an organic solvent,
   (b) removing organic solvent from the primer-coated substrate film,
   (c) gravure roll coating the primer-coated film with a waterproof coating of a solution of a copolymer of about 70–95% by weight vinylidene chloride and 5–30% by weight acrylonitrile in an organic solvent,
   (d) removing organic solvent from the waterproof coated film,
   (e) metering bar coating the waterproof coated film with a water dispersion of a barrier coating of a copolymer of vinylidene chloride with at least one comonomer selected from the group consisting of:
      methacrylic acid and its alkyl esters,
      acrylic acid and its alkyl esters,
      acrylonitrile,
      methacrylonitrile,
      vinyl chloride, and
      itaconic acid, the copolymer containing about 88% to about 96% by weight vinylidene chloride, (f) removing water from the barrier-coated film.

4. The process of claim 3 wherein the alkyl esters of methacrylic and acyrlic acid are those having an alkyl group containing 1–8 carbon atoms.

5. The process of claim 4 wherein the barrier coating copolymer contains about 90% to about 95% by weight vinylidene chloride and the comonomers are methyl acrylate and acrylonitrile.

6. The process of claim 5 wherein the poly($\epsilon$-caprolactam) substrate film is about ½ to about 5 mils thick, the primer coating is about 0.005 to about 0.05 mil thick, the waterproof coating is about 0.01 to about 0.05 mil thick, and the barrier coating is about 0.08 to about 0.32 mil thick.

7. The process of claim 6 wherein the poly($\epsilon$-caprolactam) substrate film is about ½ to 2 mils thick, the primer coating is about 0.01 to about 0.02 mil thick, the waterproof coating is about 0.01 to about 0.03 mil thick, and the barrier coating is about 0.08 to about 0.16 mil thick.

8. The process of making a plastic film comprising:
  (a) gravure roll coating a poly($\epsilon$-caprolactam) substrate film with a solution of polyurethane primer in an organic solvent,
  (b) removing organic solvent from the primer-coated substrate film,
  (c) metering bar coating the primer coated substrate film with a water dispersion of a barrier coating of a copolymer of vinylidene chloride with at least one comonomer selected from the group consisting of:
    methacrylic acid and its alkyl esters,
    acrylic acid and its alkyl esters,
    acrylonitrile,
    methacrylonitrile,
    vinyl chloride, and
    itaconic acid,
  the copolymer containing about 88% to about 96% by weight vinylidene chloride.

(d) removing water from the barrier coated substrate film, (e) controlling the tension in the film to within 0.25% to 40% of the yield point of the film in lbs./inch. while performing steps (a) to (d).

9. The process of claim 8 wherein the tension is automatically controlled.

10. The process of claim 9 wherein the alkyl esters of methacrylic and acrylic acid are those having an alkyl group containing 1–8 carbon atoms.

11. The process of claim 10 wherein the barrier coating copolymer contains about 90% to about 95% by weight vinylidene chloride, the comonomers are methyl acrylate and acrylonitrile, and the tension in the film is automatically controlled to within 5%–25% of the yield point of the film in lbs./inch.

12. The process of claim 11 wherein the poly($\epsilon$-caprolactam) substrate film is about ½ to about 5 mils thick, the primer coating is about 0.005 to about 0.05 mil thick, and the barrier coating is about 0.08 to about 0.32 mil thick.

13. The process of claim 12 wherein the poly ($\epsilon$-caprolactam) substrate film is about ½ to about 2 mils thick, the primer coating is about 0.01 to about 0.02 mil thick, and the barrier coating is about 0.08 to about 0.16 mil thick.

References Cited
UNITED STATES PATENTS

| | | |
|---|---|---|
| 2,129,929 | 9/1938 | Gurwick. |
| 2,981,637 | 4/1961 | Spencer et al. |
| 3,088,842 | 5/1963 | Kuhnel. |
| 3,383,234 | 5/1968 | Nikkel. |

MURRAY KATZ, Primary Examiner

R. HUSACK, Assistant Examiner

U.S. Cl. X.R.

117—67, 76, 111, 138.8; 118—6; 161—165, 190, 227, 254, 256